United States Patent [19]
Blumrich et al.

[11] Patent Number: 5,659,798
[45] Date of Patent: Aug. 19, 1997

[54] METHOD AND SYSTEM FOR INITIATING AND LOADING DMA CONTROLLER REGISTERS BY USING USER-LEVEL PROGRAMS

[76] Inventors: Matthias Augustin Blumrich, 208 E. Stanworth Dr.; Cezary Dubnicki, 110 Prospect St., Apt. E2; Edward William Felten, 20 Lake La.; Kai Li, 73 College Rd. West, all of Princeton, N.J. 08540

[21] Appl. No.: 595,792

[22] Filed: Feb. 2, 1996

[51] Int. Cl.$^6$ ................................................ G06F 13/00
[52] U.S. Cl. .................... 395/846; 395/842; 395/413; 395/416; 395/853
[58] Field of Search .................... 395/842–846, 395/413, 416, 853

[56] References Cited

U.S. PATENT DOCUMENTS

| | | | |
|---|---|---|---|
| 4,419,728 | 12/1983 | Larson | 395/309 |
| 4,550,368 | 10/1985 | Bechtolsheim | 395/416 |
| 4,797,812 | 1/1989 | Kihara | 395/846 |
| 4,868,738 | 9/1989 | Kish et al. | 395/846 |
| 4,959,770 | 9/1990 | Kondo et al. | 395/413 |
| 5,109,491 | 4/1992 | Nakagawa et al. | 395/417 |
| 5,301,287 | 4/1994 | Herrell et al. | 395/412 |
| 5,444,853 | 8/1995 | Lentz | 395/250 |
| 5,491,802 | 2/1996 | Thompson et al. | 395/200.18 |
| 5,530,821 | 6/1996 | Miyamoto | 395/413 |
| 5,586,253 | 12/1996 | Green | 395/186.06 |

OTHER PUBLICATIONS

Brian N. Bershad, David D. Redell, and John R. Ellis; "Fast Mutual Exclusion for Uniprocessors"; *Proceedings of 5th International Conference on Architectural Support for Programming Languages and Operating systems*, pp. 223–233, 1992.

M. Bhumrich, C. Dubnicki, E. W. Felten, K. Li, and M. R. Mesarina; "Virtual–Memory–Mapped Network Interfaces Designs"; *Proceedings of Hot Interconnects II Symposium*, pp. 134–142, Aug. 1994.

(List continued on next page.)

*Primary Examiner*—Christopher B. Shin
*Attorney, Agent, or Firm*—Watov & Kipnes, P.C.

[57] ABSTRACT

In a computer system the typically high overhead requirement for CPU instructions to operate a conventional direct memory access (DMA) controller are reduced to two user-level memory references via User-level Direct Memory Access (UDMA). The UDMA apparatus is located between the CPU and a DMA Controller, whereby the UDMA is programmed to use existing virtual memory translation hardware of the associated computer system to perform permission checking and address translation without Kernel involvement, and otherwise use minimal Kernel involvement for other operations.

11 Claims, 8 Drawing Sheets

OTHER PUBLICATIONS

M. Bhumrich, K. Li, R. Alpert, C. Dubnicki, E. W. Felten, and Sandberg; "Virtual Memory Mapped Network Interface for the SHRIMP Multicomputer"; *Proceedings of 21st International Symposium on Computer Architecture*, pp. 142–153, Apr. 1994.

John Heinlein, Kourosh Gharachorloo, Scott Dresser, and Anoop Gupta; "Integration of Message Passing and Shared Memory in the Stanford FLASH Multiprocessor"; *Proceedings of 6th International conference on Architectural Support for Programming Languages and Operating Systems*, pp. 38–50, Oct. 1994.

John L. Hennessy and David A. Patterson; "Computer Architecture: A Quantitive Approach"; Morgan Kaufman, 1996, pp. 533–527, 560, 561.

Mark Homewood and Moray McLaren; "Meiko CS–2 Interconnect Elan—Elite Design"; *Proceedings of Hot Interconnects '93 Symposium*, Aug. 2993.

Jiun–Ming Hsu and Prithviralj Banerjee; "A Message Passing Coprocessor for Distributed Memory Multicomputers"; *Proceedings of Supercomputing +03 90*, pp. 720–729, Nov. 1990.

Jeffrey Kuskin, David Ofelt, Mark Heinrich, John Heinlein, Richard Simoni, Kourosh Gharachorloo, John Chapin, David Nakahira, Joel Baxter, Mark Horowitz, Anoop Gupta, Mendel Rosenblum and John Hennessy; "The Stanford FLASH Multiprocessor"; *Proceedings of 21st International Symposium on Computer Architecture*, pp. 302–313, Apr. 1994.

C.E. Leiserson, Z.S. Abuhamdeh, D.C. Douglas, C.R. Feynman, M.N. Ganmukhi, J.V. Hill, D. Hillis, B.C. Kusznaul, M.A. St. Pierre, D.S. Wells, M.C. Wong, S. Yang, and R. Zak; "The Network Architecture of the Connection Machine CM–5"; *Proceedings of 4th ACM Symposium on Parallel Algorithms and Architectures*, pp. 272–285, Jun. 1992.

R.S. Nikhil, G.M. Papadopoulos, and Arvind; *T; "A Multithreaded Massively Parallel Architecture"; *Proceedings of 19th International Symposium on Computer Architecture*; pp. 156–167, May 1992.

Thinking Machines Corporation; *CM–5 Technical Summary*, 1991.

METHOD AND SYSTEM FOR INITIATING AND LOADING DMA CONTROLLER REGISTERS BY USING USER-LEVEL PROGRAMS

GOVERNMENT RIGHTS

This invention was made with Government support under Contract No. N00014-91-J-4039 (175-6201) and N00014-95-1-1144 [Princeton University], and under NSF grant MIP-9420653. The Government has certain rights in this invention.

BACKGROUND OF THE INVENTION

The present invention relates in general to a method and system for implementing data transfers utilizing Direct Memory Access (DMA). More particularly, the present invention relates to implementing User-level Direct Memory Access (UDMA) data transfers.

Attention is called to the following publications: Matthias A. Blumrich, et al., "Virtual-Memory-Mapped Network Interfaces", *IEEE Micro*, Vol. 15, No. 1, pages 21–28 (February 1995); Matthias A. Blumrich, et al., "A virtual memory mapped network interface for the SHRIMP multicomputer", Proc. of 21st Int'l Symp. on Computer Architecture, pages 142–153 (April 1994); John L. Hennessy and David A. Patterson, "Computer Architecture: A Quantitative Approach", Morgan Kaufmann, (1996); A. S. Tanenbaum, "Modern Operating Systems", Prentice Hall, (1992); M. Morris Mano, "Computer System Architecture", Prentice Hall, (1982).

Definitions are included to facilitate the discussion of the present invention and the prior art. Other definitions are interspersed throughout the Detailed Description of the Invention as necessary. The definitions are as follows:

Atomicity—Indivisibility of operations. Two operations comprise an atomic sequence if they happen in direct succession, with no intervening operations.

Backplane—Also known as motherboard. The printed circuit board on which is mounted the processor, memory and input/output (I/O) logic of a personal computer (PC) or similar small system.

Context Switch—A change in which process is running on the CPU. The running process is stopped and the entire state of its computation is saved. Then another process is started from the point at which it has been stopped.

Central Processing Unit (CPU)—The processor or microprocessor which executes all programs, including the operating system. The processor is time-shared.

Device—A hardware component or sub-system. Memory is one type of device.

Engine—A hardware state machine.

Interrupt—A hardware event which forces a context switch to special operating system code known as interrupt handler code.

Memory Management Unit (MMU)—Translates a processes' virtual addresses to real physical addresses based on the processes' page tables.

Polling—Periodically checking status, such as that of a device.

Process—A computation having its own virtual address space.

Protection—Restricting access to a device so that multiple processes or users may safely share the device.

Pinning—Prevents moving a page of data out of memory by virtual memory processing.

System Call—A function call to the operating system. This causes a context switch to the operating system.

System Level—The operating system. System level code normally uses the privileged mode of the CPU operation which allows the full instruction set of the processor to be used.

User-level—Applications. User-level code normally does not use the privileged mode of the CPU operation, so a restricted set of instructions is allowed.

DMA is a common technique for routing data directly between memory and an I/O device without requiring intervention by the CPU to control each datum transferred. DMA was first implemented on the IBM SAGE computer in 1955 and has always been a common approach in I/O interface controller designs for data transfer between main memory and I/O devices. For example, Local Area Network (LAN) adapters and Small Computer Systems Interface (SCSI) devices typically have DMA capability.

In a multiple process computer system, a DMA transaction can be initiated only through the operating system kernel in order to achieve protection, memory buffer management, and related address translation. The overhead of this kernel-initiated DMA transaction is often hundreds, possibly thousands of CPU instructions. As a result, DMA has been found beneficial only for infrequent operations which transfer large amounts of data, restricting its usefulness.

An increasing need for a data transfer using DMA techniques which requires minimal operating system overhead has been recognized by the computer industry. This is because many computer I/O device interface designs require low overhead DMA initiations. An example of this is the network interface of a workstation cluster, a multicomputer or multiprocessor, all of which require low-latency message passing. Another example is the graphics display interfaces which move data from main memory to graphics frame buffers.

A problem occurs utilizing traditional DMA controllers or devices since the high overhead of these devices requires coarse grained transfers of large data blocks in order to achieve the available raw DMA channel bandwidths. This is particularly true for high-bandwidth devices such as network interfaces and High Performance Parallel Interface (HIPPI) devices.

For example, the overhead of sending a piece of data over a 100 Mbyte/sec HIPPI channel on a computer such as the Paragon multicomputer is more than 350 microseconds. With a data block size of 1 Kbyte, the transfer rate achieved is only 2.7 MByte/sec, which is less than 2% of the raw hardware bandwidth. Achieving a transfer rate of 80 MByte/sec requires the data block size to be larger than 64 KBytes. The high overhead is the dominating factor which limits the utilization of DMA controllers for fine grained data transfers.

Another serious consideration with a kernel-initiated DMA transaction, is that protection is provided by the operating system because it is the only program allowed access to the configuration registers of the DMA controller. Processes must perform system calls to access the DMA controller. The system call is necessary primarily to verify the user's permission to access the device, and to ensure mutual exclusion among processes sharing the device. A system call requires a context switch to the operating system and eventually a context switch back to the application. The operating system call entails:

1. Saving the context
2. Checking permission in order to enforce protection
3. Address translation (virtual to physical)
4. Checking to see if the DMA engine is available
5. Pinning memory pages
6. Setting up DMA addresses
7. Starting the DMA
8. Unpinning the pages when the DMA transfer is complete
9. Restoring the context The time required to perform the context switches and to run the operating system is considered the overhead of accessing the DMA controller. User processes must pay the overhead of a system call to initiate a DMA operation.

Another disadvantage with a kernel-initiated or traditional DMA transaction is the cost of pinning and unpinning affected pages or alternatively copying pages into special pre-pinned I/O buffers. The physical memory pages used for DMA data transfer must be pinned to prevent the virtual memory system from paging them out while DMA data transfers are in progress. Since the cost of pinning memory pages is high, most of the systems implemented today reserve a certain number of pinned physical memory pages for each DMA controller as I/O buffers. This method may require copying data between memory in user address space and the reserved, pinned DMA memory buffers.

Another drawback of a kernel-initiated DMA transaction is the requirement of virtual-to-physical memory address translation. Because the DMA controller uses physical memory addresses, the virtual memory addresses of the user programs must be translated to physical addresses before being loaded into the DMA address registers. Virtual-to-physical address translation has a high overhead because it is performed by the operating system kernel.

SUMMARY OF THE INVENTION

The present invention improves the DMA method for data transfers between devices (memory is one type of device). It overcomes the problems of the traditional or kernel-initiated DMA transfer by requiring minimal overhead to initiate the transfer. It uses existing virtual memory translation hardware to perform permission checking and address translation without kernel involvement and needs only a small amount of hardware in addition to the traditional DMA controller. The present invention uses virtual memory mapping to allow user processes to start DMA operations via two ordinary user-level memory instructions. Thus, the present invention allows user-level programs to use ordinary STORE and LOAD instructions to initiate a DMA transaction, yet provides the same degree of protection as the traditional method. A single user-level instruction suffices to check for completion of a data transfer. This extremely low overhead allows the use of DMA for common, fine-grain operations.

The present invention dramatically reduces the overhead of accessing the DMA controller by eliminating the system call. This is accomplished by user-level access which allows processes to access the DMA controller directly, without involving the operating system. The present invention provides protected user-level access to the DMA controller. The UDMA provides protection by taking advantage of the MMU found in virtually every modern computer, and the resulting mechanism is very much like the protection of physical memory using virtual addresses. The device is accessed through special virtual addresses called proxy addresses.

The present invention does not require much additional hardware, because it takes advantage of both hardware and software in the existing virtual memory system. Special proxy regions of memory serve to communicate user commands to the hardware of the present invention, with ordinary virtual memory mapping mechanisms providing the necessary protection.

Accordingly, it is an object of the present invention to provide a method and system which requires minimal operating system overhead.

It is another object of the present invention to start DMA operations via a pair of ordinary STORE and LOAD instructions.

Another object of the present invention is to check the status of a DMA transfer via a single, ordinary LOAD instruction.

Another object of the present invention is to perform DMA operations without requiring a system call.

Yet another object of the present invention is to initiate DMA data transfers without requiring DMA memory pages be pinned.

Still another object of the invention is that it be used concurrently by an arbitrary number of untrusting processes without compromising protection.

It is yet another object of the invention to provide a method and system that puts no constraints on the scheduling of processes that use it.

It is further an object of the invention to be utilized directly from the user-level.

It is still a further object of the invention to use efficient methods for permission checking, address translation, and prevention of DMA page remapping.

With these and other objects in mind, and in view of the problems of the prior art, the present invention provides a method and system for selectively controlling the bidirectional transfer of data between two devices, whereby each device is assigned a unique range of addresses for identifying the device and serving as locations of said device from which data can be transferred or to which data can be transferred for a given data transfer the one of said devices providing data being designated as a source device, and the one of said devices receiving data being designated as a destination device, said method comprising the steps of:

programming a central processing unit (CPU) to issue a "store" instruction with a virtual destination device proxy address, and the number of bytes to transfer;

programming a memory management unit (MMU) to translate said virtual destination device proxy address to a physical destination device proxy address;

configuring the computer system hardware to direct references to said physical destination device proxy address to a user-level direct memory access device (UDMA);

programming said UDMA to translate said physical destination device proxy address into a physical destination device address indicative of said destination device and the location in said destination device to which data is to be transferred, and to derive a count value indicative of the number of bytes of data to be transferred;

transferring the address of said destination device to a destination register of a direct memory access (DMA) controller, and the count value to a count register of said DMA controller;

programming a central processing unit (CPU) to issue a "load" instruction with a virtual source device proxy address;

programming a memory management unit (MMU) to translate said virtual source device proxy address to a physical source device proxy address;

configuring the computer system hardware to direct references to said physical source device proxy address to the UDMA;

programming said UDMA to translate said physical source device proxy address into a physical source device address indicative of said source device and the location in said source device from which data is to be transferred, and to derive a control value;

transferring the address of said source device to a source register of said DMA controller; and transferring said control value to a control register of said DMA controller, to start operation of a DMA transfer state machine of said DMA controller, for responding to the addresses of said source and destination registers, and count in said count register for transferring the designated data from said source device to said destination device.

BRIEF DESCRIPTION OF THE DRAWINGS

Various embodiments of the present invention are described and illustrated herein with reference to the drawings in which like items are indicated by the same reference designation, in which.

DETAILED DESCRIPTION OF THE INVENTION

Figure 1:
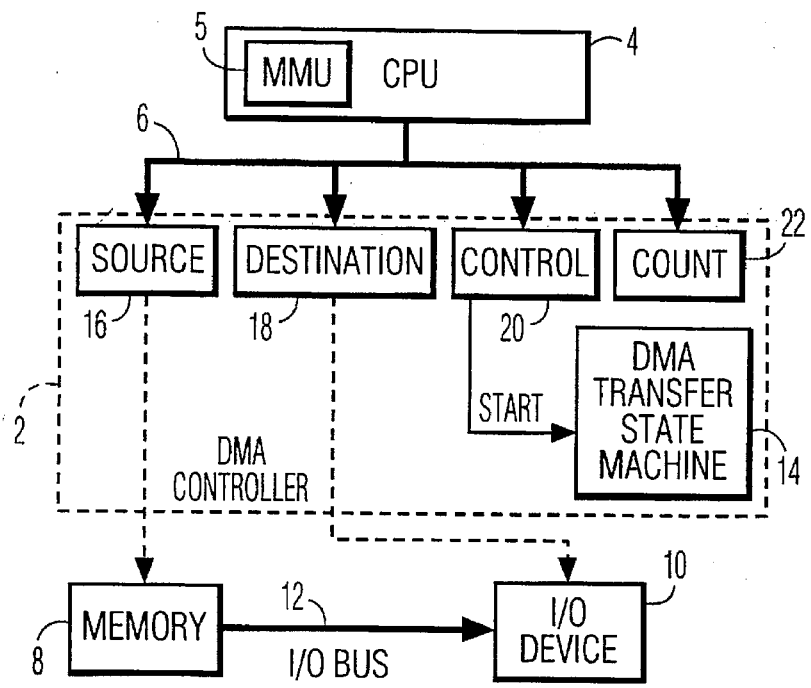
FIG. 1 is a block diagram of a system illustrating a traditional DMA controller configured to perform a memory to device data transfer.

1. Prior Art DMA System:

Turning now to FIG. 1, this is a block diagram of a prior art system developed for implementing data transfers using DMA. The system consists of a DMA controller 2, CPU 4 having a MMU 5, CPU data bus 6, memory 8 to an, I/O device 10, and I/O bus 12. The system illustrates a traditional DMA controller 2 configured to perform DMA from a memory 8 to a I/O device 10 over an I/O bus 12.

The I/O device 10 typically consists of a single port to or from which the data is transferred. The DMA controller 2 typically consists of a DMA transfer state machine 14 to perform a data transfer and several registers which configure the DMA controller 2 for the data transfer. These configuration registers are basically to specify the source and destinations of the transfer, and the amount of data to transfer. They include a SOURCE register 16, DESTINATION register 18, CONTROL register 20, and COUNT register 22. In general, to transfer data from memory 8 to the I/O device 10, the CPU 4 puts the physical memory address into the SOURCE register 16, the destination device address into the DESTINATION register 18, sets the COUNT register 22 to the number of bytes to be transferred, and triggers the CONTROL register 20 to start TRANSFERRING the first datum. After the first datum is transferred, the DMA transfer state machine 14 increments the SOURCE register 16, increments the DESTINATION register 18, decrements the COUNT register 22, and starts TRANSFERRING the second datum. These transfers continue until the COUNT register 22 reaches zero.

Optionally, the DMA controller 2 could contain a STATUS register to provide updates of its progress or the other registers could be readable for status polling. In the common DMA system, the four configuration registers (i.e. SOURCE register 16, DESTINATION register 18, CONTROL register 20, and COUNT register 22) are always loaded by the operating system. The I/O device 10 is typically configured for a data transfer by the operating system. Once the I/O device 10 is configured, the data transfer is performed in parallel with other activities of the CPU 4. This entire data transfer process requires no intervention by the CPU 4. The operating system is informed of completion of the transfer typically through an interrupt. The interrupt handler code then responds to the event. Alternatively, the operating system may be informed of the transfer by polling the DMA controller 2.

The system in FIG. 1 is illustrative of a single DMA controller. There may be multiple DMA controllers in a system. More specifically, as an example, consider a DMA controller 2 which transfers data from memory to a video frame buffer. The DMA controller 2 would contain a SOURCE register 16 to specify the base address in memory from which the data is to be transferred, and a DESTINATION register 18 to specify the base address in the video frame buffer to which the data is to be transferred. In addition, the DMA controller 2 would contain a COUNT register 22 to specify how much data to transfer, and a CONTROL register 20 to start the transfer and possibly provide some additional specifications. Altogether, a traditional DMA data transfer requires the following steps:

1. A user-level process makes a system call, asking the kernel to do an I/O operation. The user-level process names a region in its virtual memory to serve as the source or destination of the data transfer.
2. The kernel translates the virtual addresses to physical addresses, verifies the user-level process's permission to perform the requested data transfer, pins the physical pages into memory, loads the configuration registers (i.e. SOURCE register 16, DESTINATION register 18, CONTROL register 20, and COUNT register 22) of the DMA controller 2, thereby starting the DMA controller 2.

3. The DMA controller 2 performs the requested data transfer, and then notifies the kernel by changing a status register or causing an interrupt.

4. The kernel detects that the data transfer has finished, unpins the physical pages, and reschedules the user-level process.

2. Virtual Memory Mapping:

2.a. Overview

Figure 2:
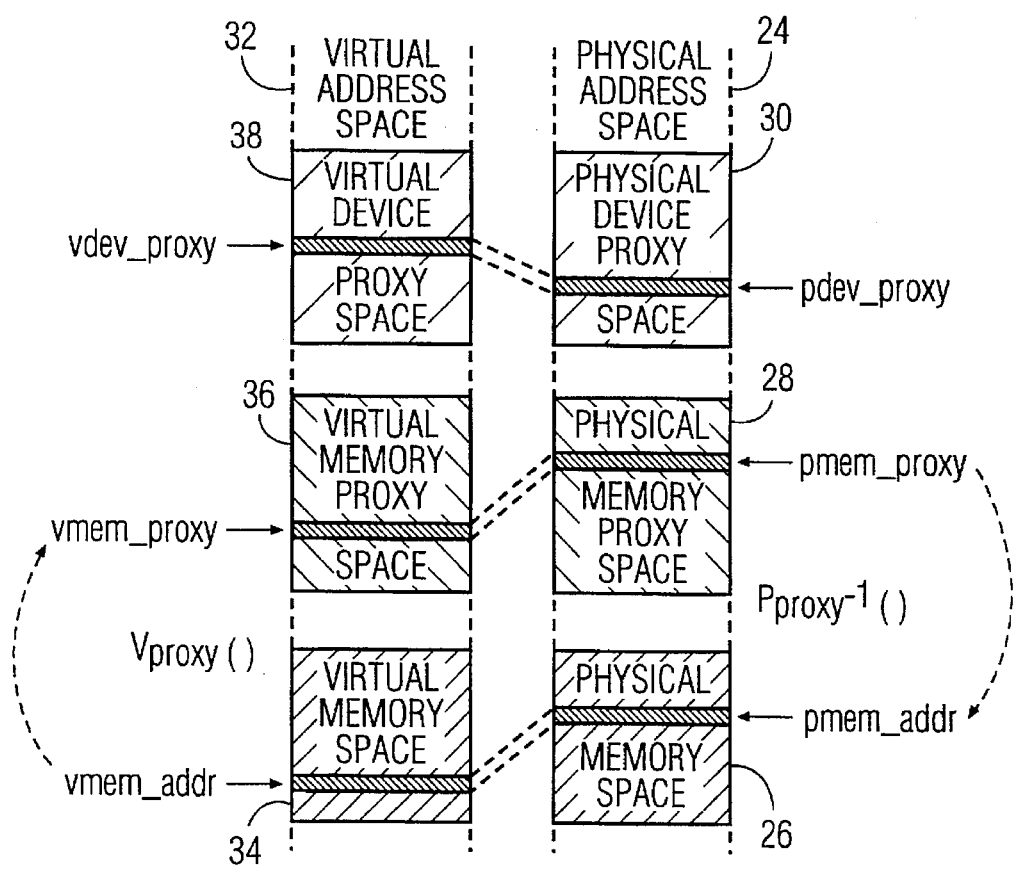
FIG. 2 is a typical memory configuration for a system embodying the present invention.
Figure 3:
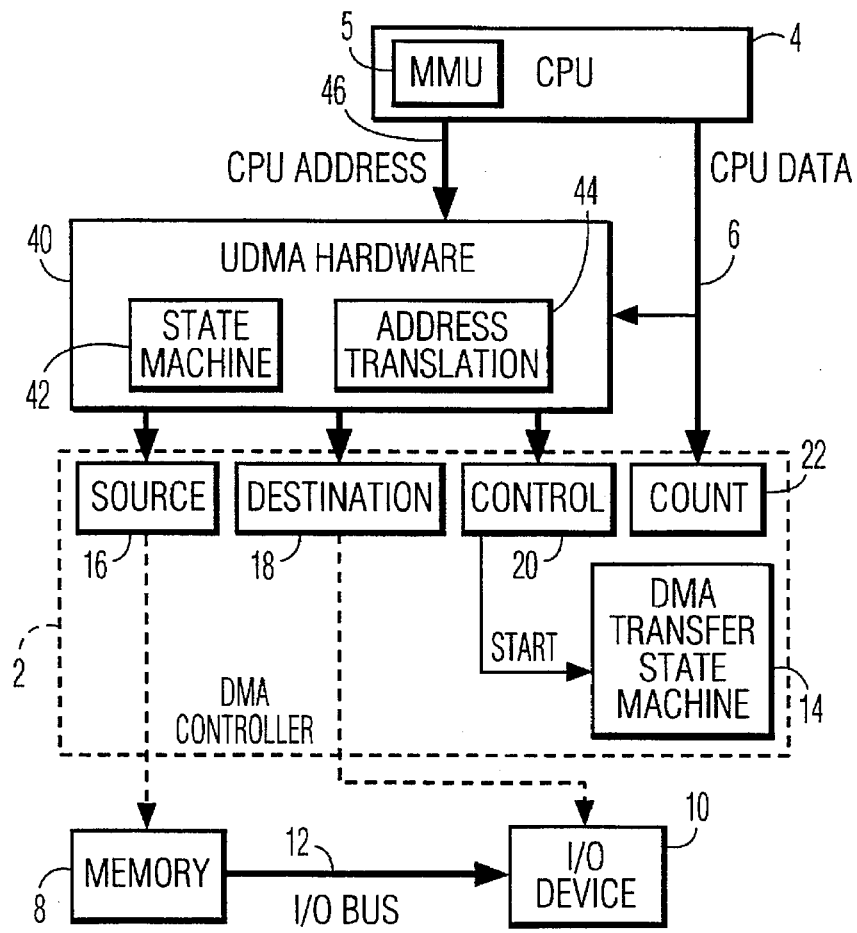
FIG. 3 is a block diagram of a system illustrating the UDMA Hardware extending from the standard DMA controller shown in FIG. 1 in accordance with the present invention.
Figure 4:
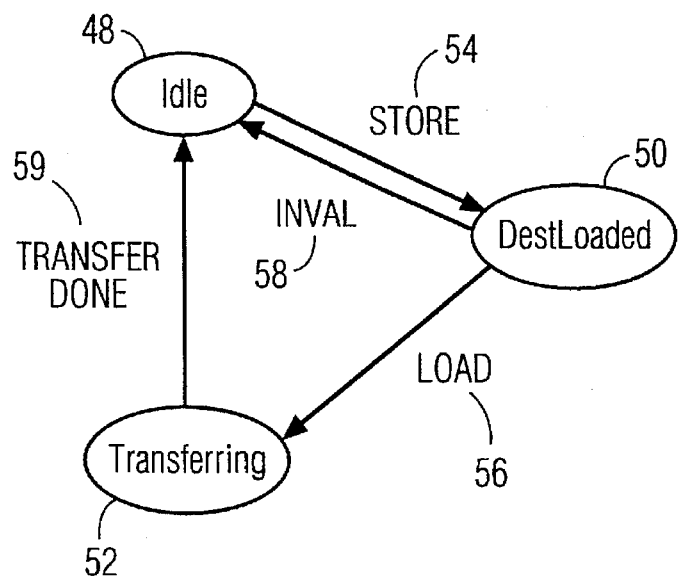
FIG. 4 is a diagram depicting state transitions in the UDMA Hardware shown in FIG. 3.

Turning now to FIGS. 2–4, the virtual memory mapping, hardware support and operating systems support implemented in the UDMA system will be discussed in more detail. Central to the UDMA system is the use of virtual memory mapping. Virtual memory is a way of giving different programs different "views" of memory or other physically addressed devices. It is used in virtually all modern computer systems.

The real memory of the computer—Random Access Memory (RAM) chips is a common example of a physically addressed device. The real memory is referred to as physical memory; each location in physical memory has a physical address. When a program accesses memory, it names memory locations using virtual addresses. The computer system translates the virtual address the program used into a physical address, which corresponds to a location in the computer's physical memory. The program's access actually references this physical memory.

Virtual memory usually operates at the granularity of pages, which are typically a few Kbytes in size. The operating system maintains a page table for each process. The page table has an entry for each virtual page; each entry says which physical page corresponds to that virtual page.

Virtual memory allows programs to use more memory than possessed by the computer. If the operating system runs out of memory, it decides to evict some virtual pages from physical memory. It copies those virtual pages to disk, and then changes the page table to say that those virtual pages are not present in memory at all. If the program references a missing virtual page (one that isn't in physical memory), the program is suspended and an event called a page fault occurs. In response to the page fault, the operating system brings the contents of the page back from the disk into physical memory (evicting another page if necessary to make room), and changes the page table to say that the page can be found in physical memory at its new location. The program is then resumed; it re-tries its memory access, which succeeds, so the program can keep going.

If several programs are running at the same time, the operating system gives each program a portion of the physical memory. Notice that the virtual memory mechanism makes it impossible for one process to access memory that belongs to another program. The only way a program can reference memory is by using virtual addresses. A process cannot touch a physical page unless that page appears in the process's page table, and the operating system ensures that a physical page only appears in the page table of the process that has permission to access it. The virtual memory provides protection among processes that don't trust each other.

Standard computer systems contain hardware mechanisms to support virtual memory. Many microprocessors have a built-in MMU which is capable of storing parts of the page table. This hardware support ensures that execution is not slowed down by the need to translate virtual addresses to physical addresses. The UDMA system uses the MMU 5 of the CPU 4 to do permission checking and virtual-to-physical address translation, thus taking advantage of the existing virtual memory translation hardware in the CPU. The virtual-to-physical address translation is a way to restrict to a subset of physical addresses since virtual mappings are windows to physical space.

2.b. Proxy Spaces

Referring now to FIG. 2, this depicts a typical memory configuration for a system embodying the present invention. In this example there are two devices, one of which is memory. Recall that in a virtual memory system, a physical address cannot be accessed by a user-level process unless the operating system has mapped a virtual address to the physical address. This mapping information is retained in process page tables and enforced by the MMU 5. This can be set up and changed often and is managed by the operating system.

Similarly, the UDMA system uses virtual memory to restrict access to the registers (i.e. SOURCE register 16, DESTINATION register 18, CONTROL register 20, and COUNT register 22) of the DMA controller 2, and restrict the values that can be written into the registers. The goal is to allow user-level processes access to the registers, but not allow them to specify transfers which would interfere with any other process.

The UDMA hardware is positioned between the CPU 4 and the DMA controller 2, and loads the registers based upon memory references performed by the CPU 4. The addresses which the UDMA hardware responds to are called proxy addresses, and they are separate from addresses used to access the real memory or other devices. The physical address space 24 contains three distinct regions: the physical memory space 26 (which is used to access memory), the physical memory proxy space 28, and the physical device proxy space 30. In general, there is one proxy space for each device.

Besides physical address spaces 24, proxy spaces exist in the virtual address space 32. The relationship between physical address space 24 and virtual address space 32 is depicted in FIG. 2. Illustrated are the physical memory space 26 and its associated physical memory proxy space 28, and physical device proxy space 30 located in the physical address space 24. The virtual address space 32 includes virtual memory space 34, virtual memory proxy space 36, and virtual device proxy space 38.

A proxy space is uncachable and it is not backed by any real physical memory, so it cannot store data. The physical memory proxy addresses have a one-to-one linear correspondence to physical memory addresses. Physical device proxy addresses have a one-to-one correspondence to physical device addresses. In addition, a processes' virtual memory proxy addresses have a to-one, linear correspondence to its virtual memory addresses. Note that the UDMA hardware translates from physical proxy page numbers to physical page numbers, so virtually any relationship can exists between these two. However, a linear, one-to-one relationship leads to the most straightforward translation hardware consisting of high-order address bit substitution.

This association can be represented by two address translation functions called Vproxy and Pproxy. In mathematical form, they are as follows:

virtual proxy address=Vproxy (virtual address)

physical proxy address=Pproxy (physical address)

When Vproxy is applied to a virtual memory address (vmem_ addr), it returns the associated virtual memory proxy address (vmem_proxy). Likewise, when Pproxy is applied to a physical memory address (pmem_addr), it returns the associated physical memory proxy address (pmem_proxy). The Vproxy and Pproxy functions have inverse functions devoted $Vproxy^{-1}()$ and $Pproxy^{-1}()$ respectively. Note that the translation functions need not be the same for virtual and physical addresses.

2.c. Proxy Mapping for UDMA:

The normal virtual-to-physical memory mapping involves mapping pages of the virtual memory space 34 to pages of the physical memory space 26 in order to provide restricted access to the physical memory. Mapping of virtual memory proxy addresses to physical memory proxy addresses, and virtual device proxy addresses to physical device proxy addresses is exactly the same and is accomplished to provide restricted access to physical proxy addresses. Recall that virtual memory usually operates on the granularity of pages. Thus, virtual proxy pages are mapped to physical proxy pages just as standard virtual memory pages are mapped to standard physical memory pages.

For every physical memory address there is one and only one corresponding physical memory proxy address. A reference to the physical memory proxy address causes the UDMA hardware to load the corresponding physical memory address into the SOURCE register 16 or the DESTINATION register 18, depending on the direction of the data transfer. Therefore, granting access to physical memory proxy addresses is the same thing as allowing the corresponding real memory address to be used for a data transfer.

In addition to the memory spaces 26 and 34 there are the device proxy spaces 30 and 38, respectively, which are used to refer to regions inside the I/O device 10. To name a physical address in the device as a source or destination for the DMA controller 2, the user process uses the unique address in physical device proxy space 30 corresponding to the desired physical address in the device.

For every physical device address there is one and only one corresponding physical device proxy address, and a reference to the physical device proxy address causes the UDMA hardware to load the corresponding physical device address into the SOURCE register 16 or DESTINATION register 18, depending on the direction of the data transfer. Therefore, granting access to physical device proxy addresses is the same thing as allowing the corresponding physical device address to be used for a data transfer.

The precise interpretation of "physical device address" is device specific. For example, if the device is a graphics frame buffer, a physical device address might specify a pixel or buffer offset. If the device is a network interface, a physical device address might name a destination network address. If the device is a disk controller, a physical device address might name a block. If the device is a memory, the physical device address is a real physical memory address.

Like ordinary memory, proxy space exists in both virtual and physical manifestations. User processes deal with virtual addresses, and the hardware deals with physical addresses. The operating system kernel sets up associated virtual memory page table entries to create the protection and mapping from virtual proxy addresses to physical proxy addresses. The ordinary virtual memory translation hardware or MMU 5 performs the actual translation and protection checking. Physical proxy space addresses are recognized by the UDMA hardware.

Accesses to the three regions of physical address space 24, namely the physical memory space 26, physical memory proxy space 28, and physical device proxy space 30 can be recognized by pattern-matching some number of high-order address bits, depending on the size and location of the regions. Each of the three regions 26, 28, and 30 in the physical address space 24 has a corresponding region 34, 36, and 38, respectively, in the virtual address space 32 which can be mapped to it. Mapping a virtual memory proxy page enables the owner of the page to perform UDMA data transfers to or from the associated memory page only. Therefore, protection of physical memory proxy pages (and their associated physical memory pages) is provided by the existing virtual memory system. A process must obtain a proxy memory page mapping for every real memory page it uses as a source or destination for UDMA data transfers.

Likewise, mapping a virtual device proxy page enables the owner of the page to perform some sort of device-specific UDMA data transfer to or from the device. Again, the virtual memory system can be used to protect portions of the device, depending on the meaning of the device proxy addresses.

The mapping allows the operating system to control which addresses processes can specify as sources or destinations of DMA. Since the UDMA hardware only responds to physical proxy addresses, a user-level process must have some virtual proxy page mapped to a physical proxy page in order to reference the physical proxy page and affect the UDMA hardware. Because the source and destination of DMA data transfers is specified by references to physical proxy addresses, the operating system has complete control over which addresses a process can perform DMA to or from.

The UDMA hardware translates physical proxy addresses to physical addresses, both for memory and devices. In order to simplify the translation, physical proxy addresses can be assigned with linear, one-to-one relationship to physical addresses. Then, for instance, memory address "A" can be specified as the source or destination of a DMA transfer by referencing offset "A" in the physical memory proxy space 28.

Similarly, virtual memory proxy addresses can be assigned with a linear one-to-one relationship to virtual memory addresses so that user-level applications can easily determine which virtual proxy address corresponds to a virtual address.

Because virtual memory protection is provided on a per-page basis, implementing a basic UDMA data transfer utilizing the present invention results in a data transfer which cannot exceed the boundaries of an individual page, either in memory or on the device. Larger data transfers must be performed as a series of individual UDMA data transfers. Multi-page transfers can be accomplished and will be discussed in greater detail below.

The device proxy mapping from virtual address space 32 to physical address space 24 is straightforward. The operating system is responsible for creating the mapping. The operating system decides whether to grant permission to a user process's request and whether permission is read-only. The operating system will set appropriate mapping in the virtual memory translation page table entries and return appropriate status to the user process.

The memory proxy mapping is similarly created, but the virtual memory system must maintain the mapping based on the virtual-to-physical memory mapping of its corresponding real physical memory. The virtual memory system guarantees that a virtual-to-physical memory proxy space mapping is valid only if the virtual-to-physical mapping of its corresponding real memory is valid. This is maintained during virtual memory page swapping, as explained in section "4".

3. Hardware:

In order to utilize the MMU 5 of the CPU 4 to do permission checking and virtual-to-physical address translation, a combination of UDMA hardware and operating system extensions is required. Referring to FIG. 3, the UDMA Hardware 40 includes a state machine 42 to interpret a two instruction (STORE,LOAD) initiation sequence, and simple physical address translation hardware 44.

The purpose of the UDMA Hardware 40 is to provide the minimum necessary support for the UDMA device of the present invention while reusing existing DMA technology. The additional hardware is used in conjunction with the standard DMA controller 2 shown in FIG. 1 to provide translation from physical proxy addresses to physical addresses, to interpret the transfer initiation instruction sequence, and to provide support for atomicity of the transfer initiation sequence during context switches.

The UDMA Hardware 40 is situated between the standard DMA controller 2 and the CPU 4. The UDMA Hardware 40 utilizes both the CPU address bus 46 and CPU data bus 6 in order to communicate very efficiently.

3.a. Address Translation Hardware:

Address translation from the physical proxy addresses to physical addresses consists of applying the function Pproxy$^{-1}$ to the physical address on the CPU address bus 46 and loading that value into either the SOURCE register 16 or DESTINATION register 18 of the standard DMA controller 2 shown in FIG. 1. For simplicity of address translation, the physical memory space 26 and the physical memory proxy space 28 can be laid out at the same offset in each half of the physical address space 26. The Pproxy and Pproxy$^{-1}$ functions then amount to nothing more than flipping the high order address bit. A somewhat more general scheme is to lay out the physical memory proxy space 28 at some fixed offset from the physical memory space 26, and add or subtract that offset for translation.

3.b. DMA Transfer Initiation Using UDMA:

In order to initiate a DMA transfer, the four configuration registers (i.e. SOURCE register 16, DESTINATION register 18, CONTROL register 20 and COUNT register 22) of the DMA controller 2 must be loaded. The UDMA mechanism is simply a method for loading these registers from user-level in a restricted manner.

3.b.1. Memory-to-Device Data Transfers:

A memory-to-device data transfer occurs when memory 8 is the source and a device 10 is the destination. To load the DESTINATION register 18 and the COUNT register 22, an application or user program issues a STORE memory reference to device proxy space. To load the SOURCE register 16 and CONTROL register 20, an application or user program issues a LOAD memory reference to memory proxy space.

Specifically, the application or user program initiates a UDMA data transfer utilizing the present invention by issuing two ordinary user-level memory references as follows:

STORE vdev_proxy, num_bytes status=LOAD vmem_proxy

Note that these instructions could alternatively be written as follows:

STORE num_bytes TO vdev_proxy

LOAD status FROM vmem_proxy

The STORE instruction specifies the destination base address of the DMA transaction (by referencing vdev_proxy) and the number of bytes to transfer (num_bytes). Num_bytes is loaded directly into the COUNT register 22.

Vdev_proxy is the unique virtual device proxy address corresponding to the desired physical device address from which to start the transfer. The UDMA hardware loads the DESTINATION register 18 with the physical device address (pdev_addr) corresponding to vdev_proxy.

The LOAD instruction specifies the source base address of the DMA transfer (by referencing vmem_proxy), and initiates the transfer, if there is no error. The LOAD returns a status code (status) to indicate whether the initiation was successful or not. More specifically, the LOAD instruction loads the SOURCE register 16 with the real physical memory address (pmem_addr) corresponding to vmem_proxy, and loads the CONTROL register 20 with the necessary value to start the transfer.

An address is composed of a page number and an offset on that page. The UDMA mechanism does not translate offsets, but only page numbers. The offsets of both the STORE and LOAD memory references are simply passed along by the MMU and the UDMA address translation hardware, and appended to the final translated page numbers before the specified configuration registers (i.e. SOURCE register 16 or DESTINATION register 18) are loaded.

FIG. 2 shows the mappings needed for a transfer from the physical memory address pmem_addr to the physical device address pdev_addr. The process performing the transfer must have mappings for vmem_addr, vmem_proxy, and the virtual device proxy address (vdev_proxy). After computing vmem_proxy =Vproxy (vmem_addr), the process issues the two instructions (STORE, LOAD) to initiate the data transfer. The UDMA device of the present invention computes pmem_addr=Pproxy$^{-1}$ (pmem_proxy), and pdev.addr=Pproxy$^{-1}$ (pdev_proxy) and initiates a DMA transfer of a number of bytes (num_bytes) starting from the base address (pmem_addr) to the I/O device base address (pdev_addr). To summarize, these are the steps required to initiate a regular UDMA data transfer:

1. A user-level process issues: STORE vdev_proxy, num_bytes.

2. The MMU 5 translates the vdev_proxy to pdev_proxy, if a mapping exists in the processes' page table. This causes the STORE memory reference to address pdev_proxy with a value of num_bytes.

3. The UDMA Hardware 40 responds to the proxy space address and translates pdev_proxy to the physical device address (pdev_addr) and loads this value into the DESTINATION register 18 of the DMA controller 2. The UDMA Hardware 40 also loads num_bytes into the COUNT register 22 of the DMA controller 2.

4. The user-level process issues: status=LOAD vmem_proxy.

5. The MMU 5 translates vmem_proxy to pmem_proxy, if a mapping exists in the processes' page table. This causes the LOAD memory reference from address pmem_proxy.

6. The UDMA Hardware 40 responds to the proxy space address and translates pmem_proxy to pmem_addr and loads this value into the SOURCE register 16 of the DMA controller 2. The UDMA Hardware 40 also loads a starting value into the CONTROL register 20 and returns status to the user-level process to indicate that the transfer was accepted. If, for some reason, the transfer was not accepted, the CONTROL register 20 is not loaded and status indicates an initiation failure.

7. The DMA transfer state machine 14 of the DMA controller 2 begins and performs the transfer in the usual manner.

It is imperative that the order of the two memory references be maintained, with the STORE proceeding the LOAD. Although many current processors optimize memory bus usage by reordering references, all provide some mechanism that software can use to ensure program order execution for memory-mapped I/O.

3.*b*.2. General Transfers:

The previous section discussed how UDMA supports memory-to-device transfers. In general, the UDMA mechanism treats memory as a device so memory-to-memory, device-to-device, and device-to-memory transfers are equally well supported. In general, the STORE instruction specifies the destination device, and the LOAD instruction specifies the source device.

It is possible to pass additional information to the destination device, directly from user level, by encoding the information into the destination proxy address, or by augmenting the num_bytes value with additional information. A specific UDMA implementation would pass this information to the destination device in a device-specific manner. Likewise, information could be passed to the source device by encoding it in the source proxy address, or by augmenting the num_bytes value.

For example, suppose the destination device is a network interface which supports two packet priorities, and the network expedites the delivery of high-priority packets. Information about the desired packet priority could be encoded in the destination proxy address, allowing the priority to be specified directly from the user level. Note that the operating system could restrict the ability of a process to send high-priority packets, by not setting up mappings for the virtual proxy pages that correspond to high-priority packets.

3.*c*. UDMA State Machine:

The STORE,LOAD transfer initiation instruction sequence is interpreted by the state machine 42 of the UDMA Hardware 40 as shown in FIG. 4. If no transition is depicted for a given event in a given state, then that event does not cause a state transition.

The state machine 42 of the UDMA Hardware 40 manages the interaction between proxy-space accesses and the standard DMA controller 2. The state machine 42 has three states: Idle state 48, DestLoaded state 50, and Transferring state 52 as shown in FIG. 4. The state machine 42 recognizes four transition events: Store event 54, Load event 56, Inval event 58, and Transfer Done event 59. Store events 54 represent STOREs of positive values to proxy space. Load events 56 represent LOADs from proxy space. Inval events 58, in the preferred embodiment, represent STOREs of negative values. This entails passing a negative, and hence invalid, value of num_bytes to proxy space. Transfer Done events 59 represent the completion of a DMA transfer.

An explanation of the state transitions is as follows: While idle, the state machine 42 is in the Idle state 48. It stays there until a STORE to proxy space is performed, causing a Store event 54. When this occurs, the referenced proxy address is translated to a real address and put in the SOURCE register 16, the value stored by the CPU 4 is put in the COUNT register 22, and the hardware enters the DestLoaded state 50.

The next relevant event is a LOAD from proxy space, causing a Load event 56. When this occurs, the referenced proxy address is translated to a real address and put into the DESTINATION register 18, and the state machine 42 enters the Transferring state 52. This cause the state machine 42 to write a value to the CONTROL register 20 to start the standard DMA data transfer.

When the data transfer finishes, the state machine 42 moves from the Transferring state 52 back into the Idle state 48, allowing user processes to initiate further data transfers. The present invention typically could include a mechanism for software to terminate a transfer and force a transition from the Transferring state 52 to the Idle state 48. This could be useful for dealing with memory system errors that the DMA controller 2 cannot handle transparently.

Several other, less common transitions are also possible. In the DestLoaded state 50, a Store event 54 does not change the state, but overwrites the DESTINATION register 18 and COUNT register 22. An Inval event 58 moves the machine into the Idle state 48 and is used to terminate an incomplete data transfer initiation sequence. In the preferred embodiment, an Inval event is caused by storing a negative value of num_bytes, although other mechanisms could be used.

3.*d*. Status Returned by Proxy LOADs:

A LOAD instruction can be performed at any time from any proxy address in order to check the status of the UDMA Hardware 40. The LOAD will only initiate a transfer under the conditions described above. Every LOAD returns the following information to the user process:

- INITIATION FLAG (1 bit): active if the access causes a transition from the DestLoaded state 50 to the Transferring state 52 (i.e. if the access started a DMA transfer); inactive otherwise.
- TRANSFERRING FLAG (1 bit): active if the UDMA state machine is in the Transferring state 52; inactive otherwise.
- INVALID FLAG (1 bit): active if the UDMA state machine is in the Idle state 48; inactive otherwise.
- MATCH FLAG (1 bit): active if the UDMA state machine is in the Transferring state 52 and the address referenced is equal to the base (starting) address of the transfer in progress; inactive otherwise.
- REMAINING-BYTES (variable size, based on page size): the number of bytes remaining to transfer if the UDMA state machine is in the DestLoaded state 50 or Transferring state 52; zero otherwise.
- IMPLEMENTATION-SPECIFIC ERRORS (variable size): used to report error conditions specific to the I/O device. For example, if the device requires accesses to be aligned on 4-byte boundaries, an error bit would be set if the requested transfer was not properly aligned.

The LOAD instruction that attempts to start a transfer will return an active INITIATION flag value if the transfer was successfully initiated. If not, the user process can check the individual bits of the return value to figure out what went wrong. As an example, if the implementation did not support memory-to-memory data transfer, an implementation-specific error bit would be set if such a transfer were requested.

If the TRANSFERRING flag or the INVALID flag is set, the user process may want to re-try its two-instruction transfer initiation sequence. If other error bits are set, a real error has occurred.

To check for completion of a successfully initiated transfer, the user process should repeat the LOAD instruction that it used to start the transfer. If this LOAD instruction returns with the MATCH flag set, then the transfer has not completed; otherwise it has.

3.*e*. Saving the Source and Destination Values:

In order to support the MATCH flag, the UDMA Hardware 40 must retain the value originally written into the SOURCE register 16 of the DMA controller 2. The UDMA Hardware 40 retains this value in its ORIG_SOURCE register. On every LOAD instruction to proxy space, the UDMA Hardware 40 compares the physical device address of the LOAD to the contents of the ORIG_SOURCE register. If the two are equal, and if the state machine 42 of the UDMA Hardware 40 is in the Transferring state 52, then the MATCH flag is set and the status value is returned to the CPU 4.

Many DMA controllers allow the CPU 4 to read the contents of the SOURCE register 16 and DESTINATION register 18 at any time. As described below, the operating system occasionally needs to read the SOURCE register 16 and DESTINATION register 18 to check whether they contain addresses on a particular page.

If the DMA controller 2 did not allow the CPU 4 to read its SOURCE register 16 and DESTINATION register 18, the UDMA Hardware 40 would retain copies of the last values written into these registers. In this case, the UDMA Hardware 40 would have an ORIG_DESTINATION register in addition to the ORIG_SOURCE register, and both registers would be readable by the CPU 4.

4. Operating System Support:

The device of the present invention requires support from the operating system kernel to guarantee the atomicity of DMA transfer initiations, to create virtual memory mappings, and to maintain memory proxy mappings during virtual memory paging.

The first invariant, I1 must hold regardless of source and destination devices:

I1: If a LOAD instruction initiates a UDMA data transfer, then the destination address and the byte count must have been STOREd by the same process.

The next three invariants, I2, I3, and I4, hold with reference to memory devices:

I2: If there is a virtual memory mapping from Vproxy (vmem_addr) to Pproxy (pmem_addr), then there must be a virtual memory mapping from vmem_addr to pmem_addr.

I3: If Vproxy (vmem_addr) is writable, then vmem_addr must be dirty.

I4: If pmem_addr is in the hardware SOURCE register 16 or DESTINATION register 18, then pmem_addr must not be remapped. Other devices may require other device-specific invariants.

These invariants are explained in detail in the following subsections.
Other devices may require other device-specific invariants.

a. Maintaining I1: Atomicity:

The operating system must guarantee I1 to support atomicity of the two-instruction transfer initiation sequence. Because the device of the present invention requires a program to use two user-level references to initiate a data transfer, and because multiple processes may share a UDMA device of the present invention, there exists a danger of incorrect initiation if a context switch takes place between the two references.

To avoid this danger, the operating system must invalidate any partially initiated UDMA data transfer on every context switch. This can be done by causing a hardware Inval event 58, causing the UDMA hardware state machine 42 to return to the Idle state 48. The context-switch code can do this with a single STORE instruction.

When the interrupted user process resumes, it will execute the LOAD instruction of its transfer-initiation sequence, which will return a failure code signifying that the hardware is in the Idle state 48 or Transferring state 52 for another process. The user process can deduce what happened and re-try its operation.

Note that the UDMA device of the present invention is stateless with respect to a context switch. Once started, a UDMA data transfer continues regardless of whether the process that started it is de-scheduled. The UDMA device does not know which user process is running, or which user process started any particular transfer.

b. Maintaining I2: Mapping Consistency:

The virtual memory manager in the operating system must cooperate with the UDMA device to create virtual memory mappings for memory proxy spaces 28 and 36, respectively, and device proxy spaces 30 and 38, respectively, and must guarantee invariant I2 to ensure that a virtual-to-physical memory proxy space mapping is valid only if the virtual-to-physical mapping of its corresponding real memory is valid.

In order for a process to perform DMA to or from the virtual memory page (vmem_page), the operating system must create a virtual-to-physical mapping for the corresponding proxy page (Vproxy (vmem_page)). Each such mapping maps Vproxy (vmem _page) to a physical memory proxy page (Pproxy (pmem_page) where pmem_page is the physical memory page). These mappings can be created on demand. If the user process accesses a virtual memory proxy page that has not been set up yet, a normal page-fault occurs. The kernel responds to this page-fault by trying to create the required mapping. Three cases can occur, based upon the state of vmem_page:

vmem_page is currently in physical memory and accessible. In this case, the kernel simply creates a virtual-to-physical mapping from Vproxy (vmem_page) to Pproxy (pmem_page).

vmem_page is valid but is not currently in physical memory. The kernel first pages in vmem_page, and then behaves as in the previous case.

vmem_page is not accessible for the process. The kernel treats this like an illegal access to vmem_page, which will normally cause a core dump.

The kernel must also ensure that I2 continues to hold when pages are remapped. The simplest way to do this is by invalidating the proxy mapping from Vproxy (vmem_page) to Pproxy (pmem_page) whenever the mapping from vmem_page to pmem_page is changed.

Note that if vmem_page is read-only for the application program, then Vproxy (vmem_page) should be read-only also. In other words, a read-only page can be used as the source of a transfer but not as the destination.

c. Maintaining I3: Content Consistency:

The virtual memory manager of the operating system must guarantee invariant I3 to maintain consistency between the physical memory and backing store.

Traditionally, the operating system maintains a dirty bit in each page table entry. The dirty bit is set if the version of a page on backing store is out of date, i.e. if the page has been changed since it was last written to backing store. The operating system may "clean" a dirty page by writing its contents to backing store and simultaneously clearing the page's dirty bit. A page is never replaced while it is dirty; if the operating system wants to replace a dirty page, the page must first be cleaned.

A page must be marked as dirty if it has been written by incoming DMA, so that the newly-arrived data will survive page replacement. In traditional DMA, the kernel knows about all DMA transfers, so it can mark the appropriate pages as dirty. However, in UDMA, device-to-memory transfers can occur without kernel involvement. Therefore, there must be another way of updating the dirty bits.

This problem is solved by maintaining invariant I3. Transfers to memory can only change a page if it is already dirty, so writes done by these Transfers will eventually find their way to backing store.

As part of starting a UDMA data transfer that will change page vmem_page, the user process must execute a STORE instruction to Vproxy (vmem_page). I3 says that this STORE will cause an access fault unless vmem_page is already dirty. If the access fault occurs, the kernel enables writes to Vproxy (vmem_page) so the user's transfer can take place; the kernel also marks vmem_page as dirty to maintain I3.

If the kernel cleans vmem_page, this causes vmem_page's dirty bit to be cleared. To maintain I3, the kernel also write-protects Vproxy (vmem_page).

Race conditions must be avoided when the operating system cleans a dirty page. The operating system must make sure not to clear the dirty bit if a DMA transfer to the page is in progress while the page is being cleaned. If this occurs, the page should remain dirty.

There is another way to maintain consistency without using I3. The alternative method is to maintain dirty bits on all of the proxy pages, and to change the kernel so that it considers vmem_page dirty if either vmem_page or Vproxy (vmem_page) is ditty. This approach is conceptually simpler, but requires more changes to the paging code.

d. Maintaining I4: Register Consistency:

The operating system must not remap any physical page that is involved in a pending transfer, because doing so would cause data to be transferred to or from an incorrect virtual address. Since transfers are started without kernel involvement, the kernel does not get a chance to "pin" the pages into physical memory.

Invariant I4 makes sure that pages involved in a transfer are never remapped. To maintain I4, the kernel must check before remapping a page to make sure that page's address is not in the SOURCE register 16 or DESTINATION register 18 (or ORIG_SOURCE register 47 or ORIG_DESTINATION register). The kernel reads the two registers to perform the check. If the page is in, either the SOURCE register 16 or DESTINATION register 18 (or ORIG_SOURCE register or ORIG_DESTINATION register), the kernel must either find another page to remap, or wait until the transfer finishes. If the hardware is in the DestLoaded state 50, the kernel may also cause an Inval event 58 in order to clear the DESTINATION register 18.

Although this scheme has the same effect as page pinning, it is much faster. Pinning requires changing the page table on every DMA, while UDMA mechanism of the present invention requires no kernel action in the common case. The inconvenience imposed by this mechanism is small, since the kernel usually has several pages to choose from when looking for a page to remap. In addition, remapped pages are usually those which have not been accessed for a long time, and such pages are unlikely to be used for DMA.

For more complex designs, the hardware might allow the kernel to do queries about the state of particular pages. For example, the hardware could provide a readable "reference-count register" for each physical page, and the kernel could query the register before remapping that page.

5. Supporting Multi-Page Transfers with Queueing:

Multi-page transfers can be effected by queueing requests in hardware. This works as long as atomicity, mapping consistency, content consistency, and register consistency are maintained. Queueing allows a user-level process to start a multi-page transfer with only two instructions per page in the best case. If the source and destination addresses are not aligned to the same offset on their respective pages, two transfers per page are needed. To wait for completion, the user process need only wait for the completion of the last transfer. A transfer request is refused only when the queue is full; otherwise the hardware accepts it and performs the transfer when it reaches the head of the queue.

Queueing has two additional advantages. First, it makes it easy to do gather-scatter transfers. Second, it allows unrelated transfers, perhaps initiated by separate processes, to be outstanding at the same time.

The disadvantage of queueing is that it makes it more difficult to check whether a particular page is involved in any pending transfers. There are two ways to address this problem: either the UDMA Hardware 40 can keep a counter for each physical memory page of how often that page appears in the UDMA Hardware 40's queue, or the UDMA Hardware 40 can support an associative query that searches the hardware queue for a page. In either case, the cost of the lookup is far less than that of pinning a page. Implementing hardware for multiple priority queues is straightforward.

6. Implementation in Scalable High-Performance Really Inexpensive Multi-Processor (SHRIMP) Multicomputer:

The present invention can be used with a wide variety of I/O devices including network interfaces, data storage devices such as disks and tape drives, audio devices, video devices, and memory-mapped devices such as graphics frame buffers. In one embodiment depicted in FIG. 5, the present invention is used in building the SHRIMP multicomputer.

SHRIMP is a multicomputer having each node being a PC with the processing power of at least an Intel Pentium Xpress PC system and the interconnect 61 typically being an Intel Paragon routing backplane. The SHRIMP network interface device 60 is the key system component which connects the Xpress PC system to a router on the backplane.

The SHRIMP network interface device 60 supports efficient, protected user-level message passing based on the UDMA device. A user process sends a network packet to another machine with a simple UDMA data transfer from memory to the network interface device. The SHRIMP network interface device 60 automatically builds a network packet containing the data and sends it to the remote node.

The SHRIMP network interface device 60 interprets the physical device address as a specification of a packet destination. This is a good example of device-specific interpretation of physical device addresses.

This preferred UDMA embodiment does not support multi-page transfers.

SHRIMP allows processes to transfer data directly between their virtual memory spaces. SHRIMP has several advantages over traditional, kernel dispatch-based message passing. One of the main advantages is that SHRIMP allows applications to perform low overhead communication since data cam move between user-level processes without context switching and message dispatching.

Another main advantage of SHRIMP is that it moves the communication buffer management to user-level. Applications or libraries can manage their communication buffers directly without having to pay the expensive overhead of unnecessary context switches and protection boundary crossings in common cases. Recent studies and analyses indicate that moving communication buffer management out of the kernel to the user-level can greatly reduce the software overhead of message passing. By using a compiled, application-tailored runtime library, latency of multicomputer message passing can be improved by about 30%.

In addition, SHRIMP takes advantage of the protection provided by virtual memory systems. Since mappings are established at the virtual memory level, virtual address translation hardware guarantees that an application can only use mappings created by itself. This eliminates the per-message software protection checking found in traditional message passing implementations.

Figure 5:
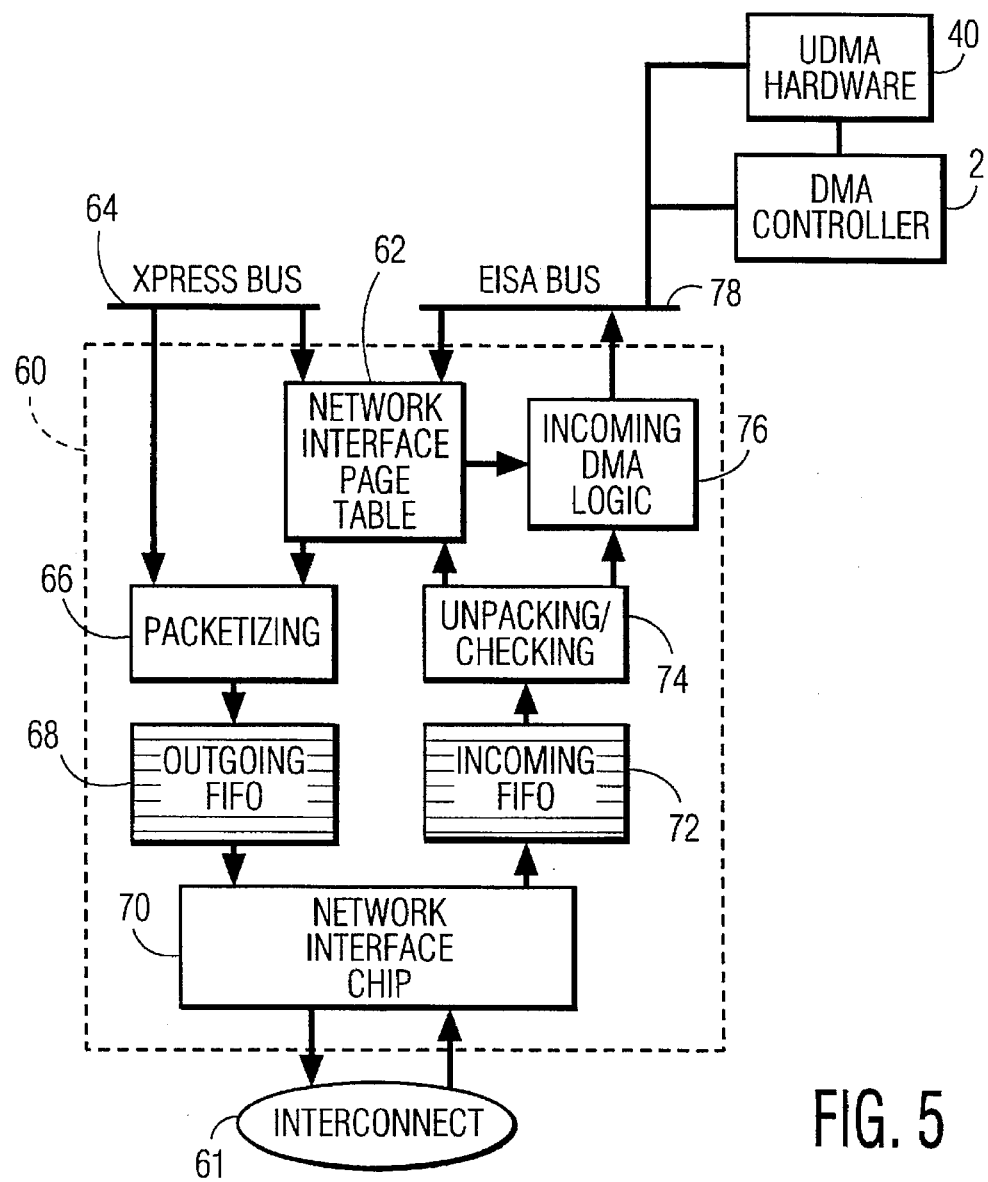
FIG. 5 is a block diagram of a network interface that utilizes the present invention.

6.a. The SHRIMP Network Interface:

FIG. 5 shows the basic architecture of the SHRIMP network interface 60. The key component of the SHRIMP network interface 60 is the Network Interface Page Table (NIPT) 62. All potential message destinations are in the NIPT 62, each entry of which specifies a remote node and a physical memory page on that node. In the context of SHRIMP, a UDMA transfer of data from memory to the SHRIMP network interface device 60 is called "deliberate update". In this case, physical device addresses refer to entries in the NIPT 62. A physical device address can be thought of as a physical device page number and an offset on that page. The page number is used to index into the NIPT 62 directly, and obtained the desired remote physical page, and the offset is combined with that page to form a remote physical memory address. Each entry in the NIPT 62 also contains a pointer to a remote node.

Packetizing 66 occurs in that using the remote node pointer and remote physical memory address from the NIPT 62 entry, the SHRIMP network interface device 60 constructs a packet header. The data transferred by the DMA controller 2 is appended to this header to form a network packet. The now complete packet is put into the Outgoing First-In-First Out (FIFO) 68. When the packet eventually reaches the head of the Outgoing FIFO 68, the Network Interface Chip (NIC) 70 injects it into the network.

When the packet arrives at the destination node, the NIC 70 puts it in the Incoming FIFO 72. Once the packet reaches the head of the Incoming FIFO 72, Unpacking/Checking 74 occurs. The physical page number from the packet header is used to index into the NIPT 62 to determine whether incoming transfers are allowed to that page. The physical memory address from the packet header is used by the Incoming DMA Logic 76 to transfer data directly to main memory via the Extended Industry Standard Architecture (EISA) bus 78.

6.b. Operating Systems Support:

The SHRIMP nodes run a slightly modified version of the Linux operating system. Several of these modifications support the UDMA mechanism as described previously in this document.

Figure 6:
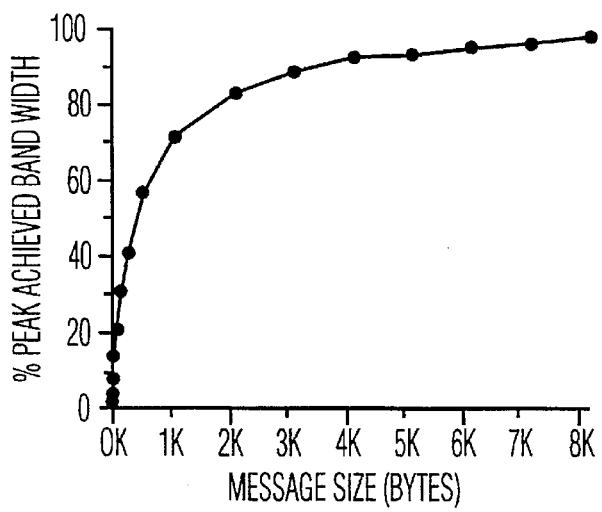
FIG. 6 is a graph of the performance of deliberate update data transfers as a percentage of the maximum measured bandwidth of the network interface architecture depicted in FIG. 5.

6.c. UDMA Hardware Performance:

The performance of the UDMA device implemented in the SHRIMP network interface 60 is shown in FIG. 6. The time for a user process to initiate a DMA data transfer is about 2.8 microseconds, which includes the time to perform the two-instruction initiation sequence and check data alignment with regard to page boundaries. The check is required because the implementation optimistically initiates transfers without regard to page boundaries, since they are enforced by the hardware. An additional transfer may be required if a page boundary is crossed.

FIG. 6 shows the bandwidth of deliberate update UDMA transfers as a percentage of the maximum measured bandwidth for various message sizes, as measured on the real SHRIMP system. The maximum is sustained for messages exceeding 8 Kbytes in size. The rapid rise in this curve highlights the low cost of initiating UDMA data transfers.

The bandwidth exceeds 50% of the maximum measured at a message size of only 512 bytes. The largest single UDMA data transfer is a page of 4 Kbytes, which achieves 95% of the maximum bandwidth. The slight dip in the curve after that point reflects the cost of initiating and starting a second UDMA data transfer.

Figure 7:
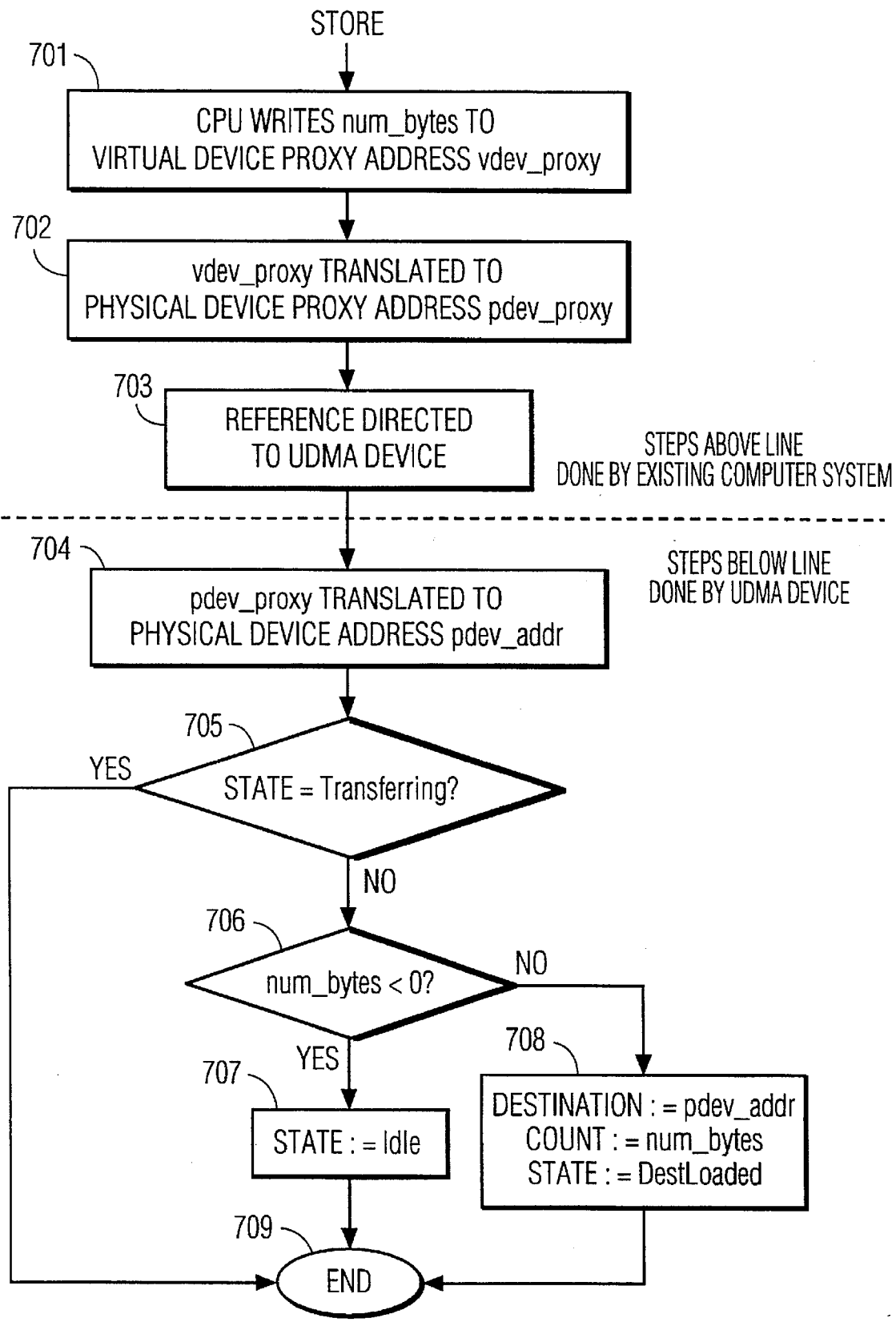
FIG. 7 shows a flowchart illustrating the steps completed by the computer system and the UDMA device when a STORE instruction is issued by a user process during a memory-to-device data transfer.
Figure 8:
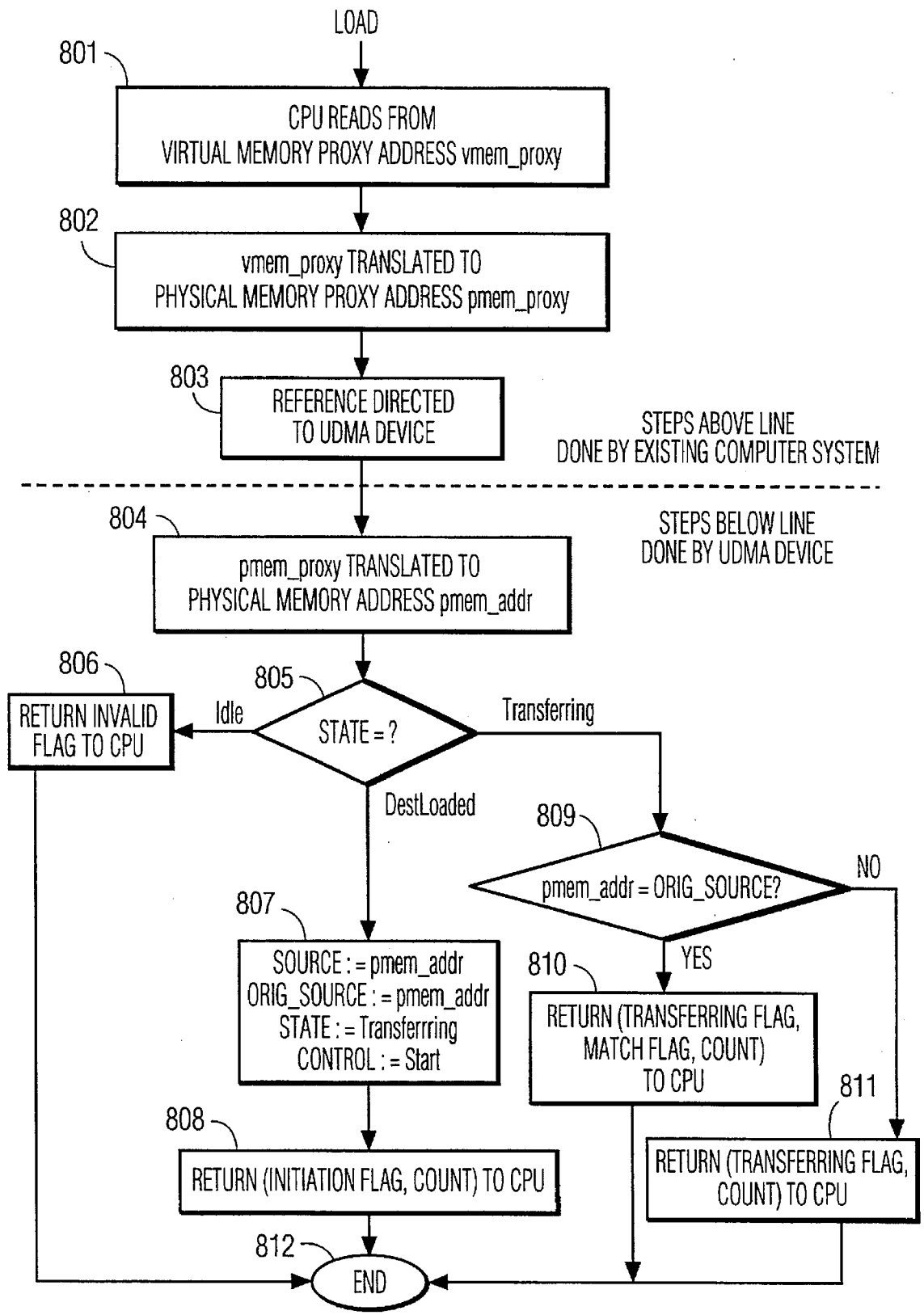
FIG. 8 shows a flowchart illustrating the steps completed by the computer system and the UDMA device when a LOAD instruction is issued by a user process during a memory-to-device data transfer.

7. The Steps Completed by the Existing Computer System and UDMA Device When the STORE and LOAD Instructions Are Issued in a Memory-to-Device Data Transfer:

The flowcharts in FIG. 7 and FIG. 8 illustrate the procedure completed by the CPU 4 and the UDMA hardware 40 when a STORE instruction and then a LOAD instruction is issued by a user-level process. From the user-level process or application point of view, once the initial virtual to physical mapping is in place, the application will initiate the UDMA data transfer by doing a STORE instruction followed by a LOAD instruction. The STORE instruction will always specify the DESTINATION register 18 and the LOAD instruction will always specify the SOURCE register 16. Since this is a Memory-to-Device data transfer, the DESTINATION is the I/O device 10 and the SOURCE is the memory 8.

Reference is made to steps 701 through 709. To begin the user-level process or application computes the virtual device proxy address (i.e. vdev_proxy). The user-level process issues: STORE vdev_proxy, num_bytes, thus performing a STORE instruction to vdev_proxy storing the number of bytes (i.e. num_bytes) it wants to transfer.

Steps 701 through 703 are completed by the standard PC system or similar computer system. At step 701, the CPU writes num_bytes to vdev_proxy. At step 702, the normal address translation mechanism, namely the MMU 5, translates vdev_proxy to pdev_proxy if a mapping exists in the processes' page table. Since this is a reference to a proxy space the UDMA device 80 responds at Step 703.

Next, steps 704 through 709 are accomplished by the UDMA device 80. The UDMA device 80 recognizes and decodes pdev_proxy. The UDMA device 80 translates pdev_proxy to the physical device address (i.e. pdev_addr) at step 704. Next, at step 705, it is determined if the state machine 42 of the UDMA Hardware 40 is in the Transferring state 52. If it is in the Transferring state 52, the procedure is ended (step 709). If the state machine 42 of the UDMA Hardware 40 is not in the Transferring state 52 and if the num_bytes to be transferred is less than zero (as depicted in step 706), then the state machine 42 is set to Idle state 48 at step 707 and the procedure is ended at step 709.

If the state machine 42 of the UDMA Hardware 40 is not in the Transferring state 52 and the num_bytes is not less than zero then a Store event 54 has occurred. At step 708 the DESTINATION register 18 of the DMA controller 2 is set to the pdev_addr, the COUNT register 22 is assigned num_bytes, and the state machine 42 is placed in the DestLoaded state 50.

In summary, the UDMA device 80 has translated the pdev_proxy to a device address and puts that value in the DESTINATION register 18 of the DMA controller 2. It also takes the value that was stored, which is the number of bytes to transfer and puts that into the COUNT register 22 of the DMA controller 2.

Referring now to FIG. 8, the user-level process issues a LOAD instruction to a virtual memory proxy address (vmem_proxy) in the typical form of: status=LOAD vmem_proxy. Steps 801 through 803 are accomplished by the standard PC or similar computer system. First, at 801 the CPU reads from vmem_proxy. At step 802, the computer system, through the normal virtual to physical mapping mechanism (i.e. the MMU 5), translates vmem_proxy to a physical memory proxy address (i.e. pmem_proxy), if a mapping exists in the processes' page table. Pmem_proxy is recognized and decoded by the UDMA hardware at step 803.

Steps 804 through 812 are executed by the UDMA device 80. In general, the UDMA Hardware 40 responds to the proxy space address and translates pmem_proxy to a physical memory address (pmem_addr) at step 804. A load instruction either loads the source register 16 or is a status request. If the state machine 40 is in the DestLoaded state 50, then the SOURCE register 16 is loaded. If the state machine 40 is in the Idle state 48 or Transferring state 52, then the LOAD instruction is a status request. If in the Idle state 48, then the status returned to the CPU 4 is the INVALID flag indicating the device is in the Idle state 48 at steps 805–806 and ended at step 812.

If the state machine 42 of the UDMA hardware 40 is in the Transferring state 52 at step 805, then the pmem_addr is compared to the ORIG_SOURCE register 47 at step 809. If pmem_ addr equals the value in the ORIG_SOURCE register 47, then the MATCH flag is activated indicating that the address of the LOAD equals the original source address of the current Transfer in progress at step 810. The Transferring flag is active and is returned to the CPU 4 as well as the COUNT. If the pmem_addr is not equal to the value of the ORIG_SOURCE register then the TRANSFERRING flag is active and is returned along with the COUNT to the CPU 4. Note that returning COUNT is optional at steps 810 and 811. In the preferred embodiment, COUNT will be returned to allow software to predict how long the transfer going on will last.

If the state machine 42 of the UDMA Hardware 40 is in the DestLoaded state 50, then the UDMA device 80 loads pmem_addr into the SOURCE register 16 of the DMA controller 2 and the ORIG_SOURCE register at step 807. The UDMA Hardware 40 also loads in an appropriate value into the CONTROL register 20 to start the transfer. At this point a LOAD event 56 has occurred and the state machine 42 transitions to the Transferring state 52. The UDMA device 80 returns status to the user-level process to indicate that the transfer was accepted. If for some reason, the transfer was not accepted, the CONTROL 20 is not loaded and status indicates an initiation failure.

At this point, all four configuration registers (i.e. SOURCE register 16, DESTINATION register 18, CONTROL register 20, and COUNT register 22) are loaded. The DMA transfer state machine 14 of the DMA controller 2 begins and performs the transfer in the usual manner.

Figure 9:
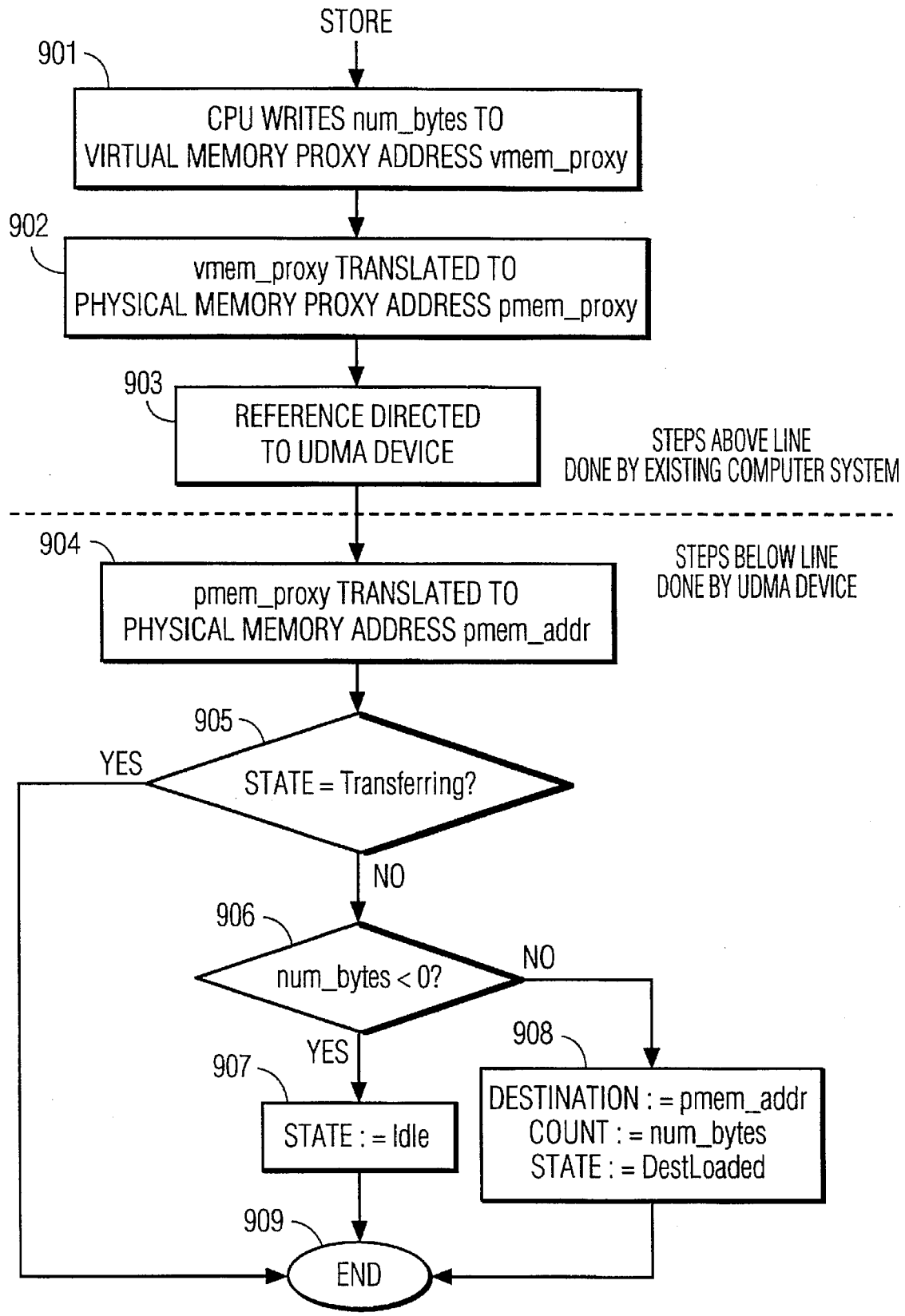
FIG. 9 shows a flowchart illustrating the steps completed by the computer system and the UDMA device when a STORE instruction is issued by a user process during a device-to-memory data transfer.
Figure 10:
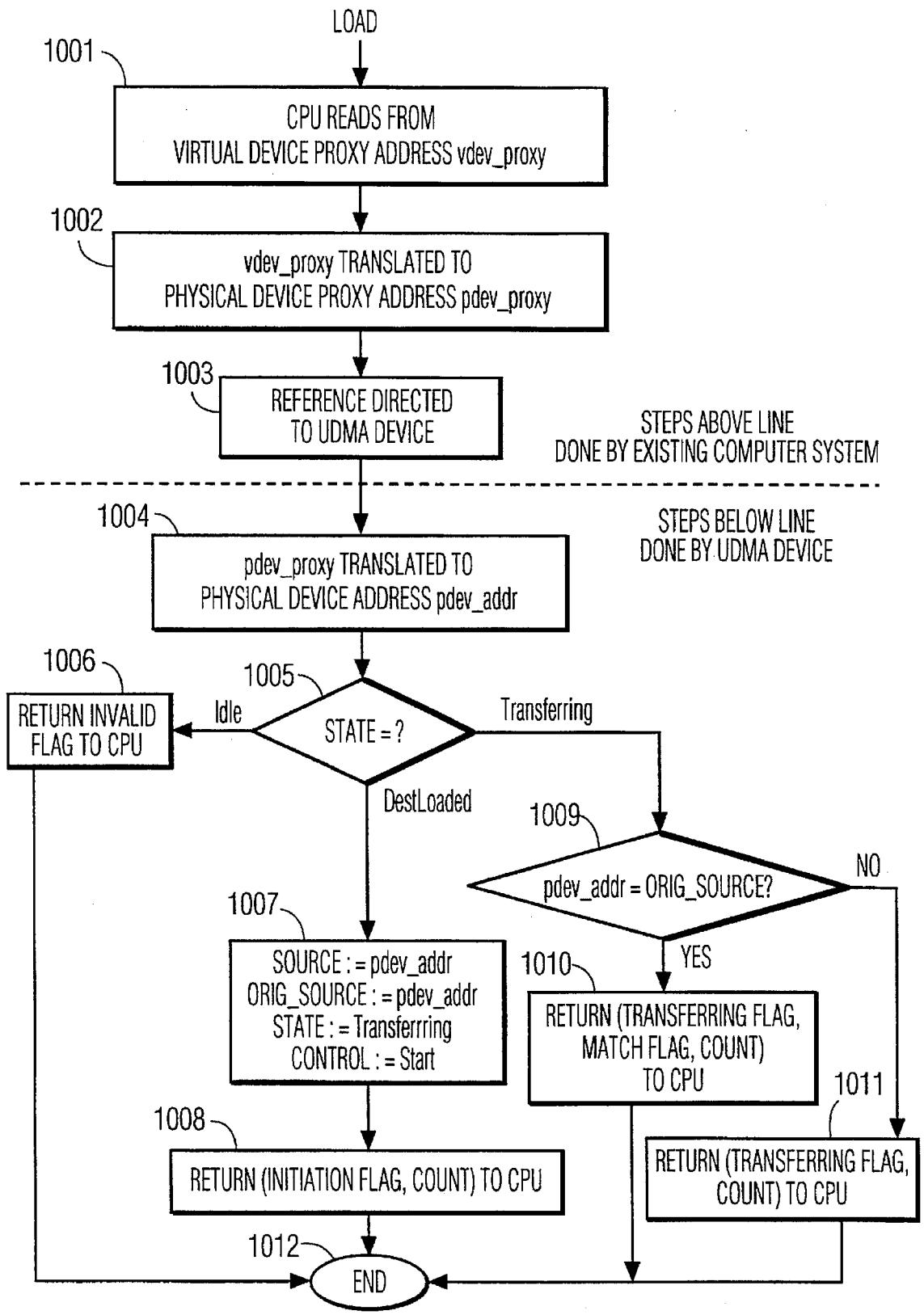
FIG. 10 shows a flowchart illustrating the steps completed by the computer system and the UDMA device when a LOAD instruction is issued by a user process during a device-to-memory data transfer.

FIG. 9 and FIG. 10 show the order of events for a device-to-memory data transfer. The STORE and LOAD instructions Sequence of events for a device-to-memory data transfer is substantially identical to the STORE and LOAD sequence of events for memory-to-device data transfers depicted in FIG. 7 and FIG. 8. Instead, however, the STORE instruction goes to memory proxy space (see FIG. 9, steps 901–909), and the LOAD instruction comes from device proxy space (see FIG. 10 steps 1001–1012).

Figure 11:
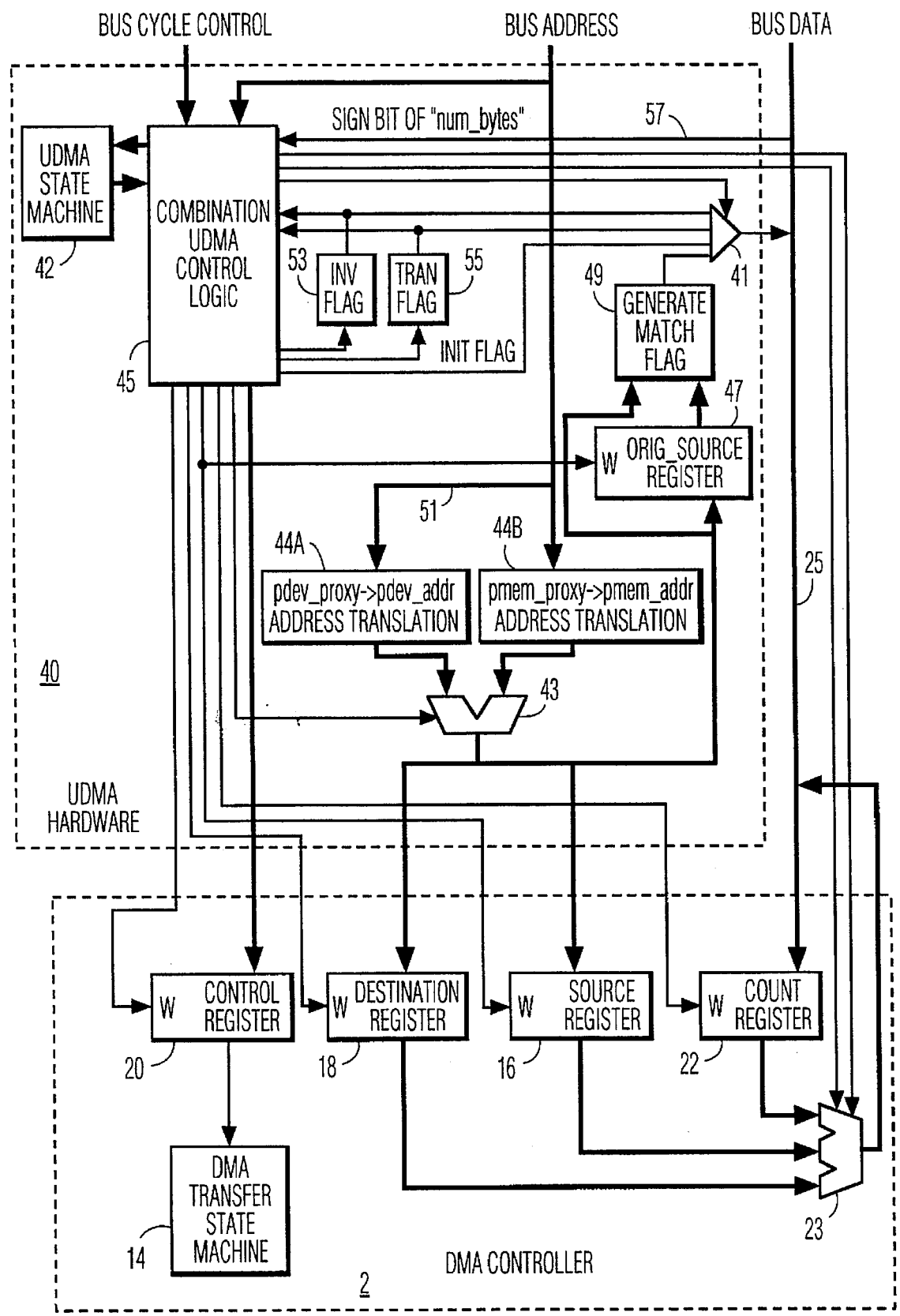
FIG. 11 is a schematic diagram of the UDMA Hardware in accordance with the preferred embodiment of the present invention.

8. Data Transfer:

With reference to FIG. 11, data transfer relative to a more detailed diagram of the UDMA 40 and DMA controller will now be described.

In FIG. 11, thick lines represent multiple wires, and thin lines represent single conductors or wires.

The triangular symbol represents a buffer 41, possibly for multiple signals. Each buffer 41 responds to has a single, common enable signal. A multiplexor 43 merges the respective output signal groups of the address translators 44A and 44B, and selects one of the two signal groups for propagation to the output of multiplexor 43, under control of a single select signal.

Each of the registers 16, 18, 20, 22, stores an input value under control of the write (W) input from combinatorial UDMA Control Logic 45, and provides that value at its respective register output. The ORIG_SOURCE register 47 is always written when the SOURCE register 16 is written, and the values written to both registers 47, 16 are the same.

The MATCH flag generator 49 is an equality comparator between the two groups of input signals from translators 44A, 44B, respectively, via multiplexor 43.

The two address translators 44A, 44B, each convert a physical proxy address from the bus 51 to a physical address by translating the page number based upon inverse Pproxy () functions.

The DMA Controller 2 includes a 3-input multiplexor 23 which selects one of the three input signal groups from registers 18, 20, and 22, for propagation to the bus data line 25, under control of two select signals from the combinatorial UDMA control logic 45. Because the two select signals can specify four different configurations for the multiplexor 23, it is assumed that one of those configurations disables the output and the other three select between the three inputs and enable the output with one of the inputs.

Note that FIG. 11 does not show a complete Traditional DMA Controller 2; only the four configuration registers 16, 18, 20, 22, a 3-input multiplexor 23, and a state machine 14 are shown.

This UDMA 40 design example assumes that the DESTINATION, SOURCE, and COUNT registers 18, 16, 22, respectively, of the DMA Controller 2 can be read, and their values driven onto the Bus Data line 25. In this example, the reading of these registers is controlled by the control logic 45, although other means can be used. The COUNT register 22 need never be read, although it is desirable in the best mode to provide status information to LOAD cycles. The DESTINATION and SOURCE registers 16, 18 respectively, are read by the operating system in order to avoid page pinning. If the DMA Controller 2 supports these reads, then the UDMA hardware 40 need not be involved with this at all. If not, then the UDMA hardware 40 must provide a means for the ORIG_SOURCE register 47 to be read (not shown), and a similar, readable ORIG_DESTINATION register (not shown) must be provided to store the value last written into the DESTINATION register 18.

The combinatorial logic 45 responds to memory references in proxy space in a bus-specific manner.

The UDMA state machine 42 performs the state transitions shown in FIG. 4. All the control of the UDMA hardware 40 is provided by the logic 45. For example, this diagram shows the combinatorial UDMA control logic 45 maintaining the flag registers 53 and 55, respectively.

The sign bit of the "num_bytes" value goes directly to the control logic 45 during STORE cycles in order to cause an Inval 58 state transition when a negative count value is stored. All the other "num_bytes" bits go directly to the COUNT register 22 of the DMA Controller 2.

The two flag registers, INVALID (abbreviated INV 53) and TRANSFERRING (abbreviated TRANS 55), are written under control of the logic 45.

When a STORE is performed, the logic 45 looks at the Bus Address on bus 51 and determines if the STORE is within proxy space. If not, nothing further happens. If the UDMA state machine 42 is in the Transferring state, then nothing further happens. If the UDMA state machine 42 is not in the Transferring state, and the sign bit of the "num_bytes" value on the Bus Data signal on line 25 is set (negative count), then the UDMA state machine 42 goes to the Idle State and the INV flag 53 is set. If the UDMA state machine 42 is not in the Transferring state, and the sign bit of the "num_bytes" value on the Bus Data signals is clear (positive count) then the count value is put into the COUNT register 22, the 2-input multiplexor 49 selectes one of the two address translations depending on whether the STORE was to memory proxy space or device proxy space, the DESTINATION register 18 is written with the output of the 2-input multiplexor 43, the INV flag 53 is cleared, and the UDMA state machine 42 enters the DestLoaded state.

When a load is performed, the Combinatorial Logic 45 looks at the Bus Address on bus 51 and determines if the STORE is within proxy space. If not, nothing further happens. If the UDMA state machine 42 is in the DestLoaded state, the 2-input multiplexor 43 selects one of the two address translations depending on whether the LOAD was from memory proxy space or device proxy space, the SOURCE register 16 is written with the output of the 2-input multiplexor 43, the TRANS flag 55 is set, the CONTROL register 20 is written with a value to start the DMA Controller 2 all flags including INIT flag on conductor 63 are enabled, and the contents of COUNT Register 22 are enabled onto Bus Data line 25 for the duration of the LOAD, and the UDMA state machine 42 enters the Transferring state. If the UDMA state machine 42 is in the Transferring state, all the flags and the COUNT register 22 are enabled onto the Bus Data line 25 for the duration of the LOAD. The MATCH flag is the output of the equality comparator 49, and is active if the translated address matches the contents of the ORIG SOURCE register 47.

Referring to FIG. 8 and FIG. 10, the UDMA Hardware 40 returns all of the flags on every return() event. The return() function indicates that the specified flags are returned active, where an active flag indicates that the condition it is intended to indicate has occurred.

9. Conclusion:

Although various embodiments of the invention have been shown and described herein, they are not meant to be limiting. Those of skill in the art may recognize certain modifications to these embodiments, which modifications are meant to be covered by the spirit and scope of the appended claims.

What is claimed is:

1. A system for selectively controlling the bidirectional transfer of data between two devices, whereby each device is assigned a unique range of addresses for identifying the device and serving as locations of said device from which data can be transferred or to which data can be transferred for a given data transfer the one of said devices providing data being designated as a source device, and the one of said devices receiving data being designated as a destination device, said method, comprising the steps of:

programming a central processing unit (CPU) to issue a "store" instruction with a virtual destination device proxy address, and the number of bytes to transfer;

programming a memory management unit (MMU) to translate said virtual destination device proxy address to a physical destination device proxy address;

configuring the computer system hardware to direct references to said physical destination device proxy address to a user-level direct memory access device (UDMA);

programming said UDMA to translate said physical destination device proxy address into a physical destination device address indicative of said destination device and the location in said destination device to which data is to be transferred, and to derive a count value indicative of the number of bytes of data to be transferred;

transferring the address of said destination device to a destination register of a direct memory access (DMA) controller, and the count value to a count register of said DMA controller;

programming a central processing unit (CPU) to issue a "load" instruction with a virtual source device proxy address;

programming a memory management unit (MMU) to translate said virtual source device proxy address to a physical source device proxy address;

configuring the computer system hardware to direct references to said physical source device proxy address to the UDMA;

programming said UDMA to translate said physical source device proxy address into a physical source device address indicative of said source device and the location in said source device from which data is to be transferred, and to derive a control value;

transferring the address of said source device to a source register of said DMA controller; and transferring said control value to a control register of said DMA controller, to start operation of a DMA transfer state machine of said DMA controller, for responding to the addresses of said source and destination registers, and count in said count register for transferring the designated data from said source device to said destination device.

2. The method of claim 1, wherein said step of programming an MMU to translate said virtual destination device proxy address includes the steps of:

programming said CPU for mapping virtual destination device proxy addresses to physical destination device proxy addresses;

programming a process page table to contain said mappings from virtual destination device proxy addresses to physical destination device proxy addresses;

programming said CPU to issue said "store" instruction with said virtual destination device proxy address;

programming said MMU to respond to said virtual destination device proxy address associated with said store instruction; and programming said MMU to use said table resulting from said mapping step to translate said virtual destination device proxy address into said physical destination device proxy address.

3. The method of claim 2, wherein the step of programming a process page table to contain mappings from virtual device proxy addresses to physical device proxy addresses further includes the steps of:

deciding whether to grant permission to a user-level process's request;

determing whether permission is read-only;

setting the appropriate mapping in the process page table; and returning appropriate status to the user process.

4. The method of claim 1, wherein said step of programming an MMU to translate said virtual source device proxy address includes the steps of:

programming said CPU for mapping virtual source device proxy addresses to physical source device proxy addresses;

programming a process page table to contain said mappings from virtual source device proxy addresses to physical source device proxy addresses;

programming said CPU to issue said "load" instruction with said virtual source device proxy address;

programming said MMU to respond to said virtual source device proxy address associated with said load instruction; and programming said MMU to use said table resulting from said mapping step to translate said virtual source device proxy address into said physical source device proxy address.

5. The method of claim 1, further including the step of assigning a single UDMA to more than two devices, by assigning a unique range of addresses to each device.

6. The method of claim 1, wherein said step of programming said CPU to issue a "store" instruction further includes providing device specific control values in said "store" instruction.

7. The method of claim 1, wherein said step of programming said CPU to issue a "load" instruction further includes providing device specific control values in said "load" instruction.

8. In a computer system including a central processing unit (CPU) programmed to issue a user request to transfer data from a source device to a destination device by driving a direct memory access (DMA) controller to operate a DMA transfer state machine to retrieve data from said source device for transfer over a bus to said destination device, said DMA controller including source, destination, control, and count registers which are typically loaded by said CPU for effecting the data transfer, wherein the improvement comprises:

a user-level direct memory access device (UDMA) connected between said CPU and said DMA controller, for substantially reducing the time and processing steps said CPU must spend in loading the source, destination, control, and count registers of said DMA controller;

a table of a mapping of virtual destination device proxy addresses to physical destination device proxy addresses, and of virtual source device proxy addresses to physical source device proxy addresses;

said CPU including means for issuing successive "store" and "load" instructions;

a memory management unit (MMU) responsive to a store mode of operation including a virtual destination device proxy address to translate it via said table to a physical destination device address, and during a later load mode of operation responding to a virtual source device proxy address to translate it via said table to a physical source device address;

said UDMA including means responsive to said physical destination device address, for producing and transferring appropriate values to said destination and count registers; and said UDMA further including means responsive to said physical source device address, for producing and transferring appropriate values to said source and control registers, to operate said DMA controller for producing signals to cause the source device to transfer data to said destination device.

9. A method for providing restricted access to a direct memory access controller (DMA) transaction from a source device to a destination device, said method comprising the steps of:

(a) issuing a STORE instruction including a virtual destination device proxy address, and number of bytes, from a user-level process;

(b) translating said virtual destination device proxy address to a physical destination device proxy address using a pre-established mapping in a process page table of said user-level process;

(c) translating said physical destination device proxy address to a physical destination device address to produce a first value;

(d) loading said first value into a DESTINATION register of the DMA controller;

(e) loading said number of bytes to be transferred into a COUNT register of the DMA controller;

(f) issuing a status=LOAD virtual source device proxy address instruction from the user-level process;

(g) translating said virtual source device proxy address to a physical source device proxy address from using a pre-established mapping in a process page table of said user-level process;

(h) translating said physical source device proxy address to a physical source device address to produce a second value;

(i) loading said second value into a SOURCE register of the DMA controller;

(j) loading a starting value into a CONTROL register of the DMA controller and returning a status to the user-level process to indicate that the transfer was accepted;

(k) returning status to the user-level process to indicate an initiation failure if the transfer was not accepted; and (l) performing a DMA data transfer.

10. The method of claim 9 wherein the step of translating the physical destination device proxy address is accomplished by applying a $Pproxy^{-1}$ function to the physical destination device proxy address, and the step of translating the physical source device proxy address is accomplished by applying the $Pproxy^{-1}$ function to the physical source device proxy address.

11. The method of claim 9, wherein performing a DMA data transfer comprises the steps of:

transferring the datum;

incrementing the SOURCE register via the DMA controller;

incrementing the DESTINATION register via the DMA controller;

decrementing the COUNT register via the DMA controller;

starting the transfer of the next datum; and repeating the steps until the COUNT register reaches zero.

* * * * *